US011592994B2

(12) United States Patent
Lee et al.

(10) Patent No.: US 11,592,994 B2
(45) Date of Patent: Feb. 28, 2023

(54) PROVIDING PREFERENTIAL TREATMENT TO METADATA OVER USER DATA

(71) Applicant: EMC IP Holding Company LLC, Hopkinton, MA (US)

(72) Inventors: Shuyu Lee, Acton, MA (US); Steven A. Morley, Mendon, MA (US); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 251 days.

(21) Appl. No.: 17/083,933

(22) Filed: Oct. 29, 2020

(65) Prior Publication Data
US 2022/0137829 A1 May 5, 2022

(51) Int. Cl.
G06F 3/06 (2006.01)
(52) U.S. Cl.
CPC ............ G06F 3/0619 (2013.01); G06F 3/065 (2013.01); G06F 3/0689 (2013.01)
(58) Field of Classification Search
None
See application file for complete search history.

(56) References Cited

U.S. PATENT DOCUMENTS

| 8,438,135 | B1 | 5/2013 | Natanzon et al. | |
|---|---|---|---|---|
| 8,621,318 | B1* | 12/2013 | Micheloni | G06F 11/1012 714/755 |
| 10,146,456 | B1* | 12/2018 | Gao | G06F 3/065 |
| 10,649,892 | B2 | 5/2020 | Gao et al. | |
| 11,003,554 | B2 | 5/2021 | Shveidel et al. | |
| 2013/0124798 | A1* | 5/2013 | Aszmann | G06F 3/067 711/114 |
| 2016/0202925 | A1* | 7/2016 | Dain | G06F 3/0689 714/6.22 |
| 2019/0095110 | A1* | 3/2019 | Watt | G06F 3/0616 |

* cited by examiner

Primary Examiner — Michael Alsip
(74) Attorney, Agent, or Firm — BainwoodHuang

(57) ABSTRACT

A technique provides preferential treatment to metadata over user data when protecting data in a mapped-RAID system. The technique involves generating metadata based on user data, storing the metadata in mirrored storage of the mapped-RAID system (e.g., 2-way mirrored storage), and storing the user data in non-mirrored storage of the mapped-RAID system (e.g., writing user data with parity in accordance with RAID 6). The mapped-RAID system provides reliability preference toward maintaining the metadata over maintaining the user data while the metadata and the user data are stored within the mapped-RAID system. Accordingly, the technique is able to concurrently provide high reliability and high storage efficiency.

20 Claims, 6 Drawing Sheets

PROVIDING PREFERENTIAL TREATMENT TO METADATA OVER USER DATA

BACKGROUND

Conventional data storage systems store and retrieve host data on behalf hosts. To effectively manage such host data, these data storage systems utilize metadata.

From a reliability perspective, the conventional data storage systems typically protect such host data and metadata uniformly. For example, in the event of a storage drive failure, such a conventional data storage system rebuilds any host data and metadata that was stored on the failed storage drive sequentially (i.e., rebuilds the data that resided on the failed storage drive in order from beginning to end). As another example, in the event of a storage drive failure, such a data storage system may vary the priority levels for rebuilding the host data and the metadata based on host input/output (I/O) load impact (i.e., set the priority for rebuilding both host data and metadata based on the current amount of host I/O loading). Additionally, such a conventional data storage system may uniformly distribute the host data and the metadata among the same group of storage drives (i.e., manage the host data and the metadata within the same fault domain). Furthermore, such a conventional data storage system may initiate a proactive data relocation task that relocates both host data and metadata from a storage drive that has just reached a certain amount of useful life (e.g., relocate any user data and metadata from a storage drive as soon as the storage drive reaches 95% of the storage drive's prescribed wear level).

SUMMARY

Improved data storage techniques are directed to providing reliability bias (or preference) toward maintaining metadata over maintaining user data while the metadata and the user data are stored within a mapped-RAID (Redundant Array of Independent Disks) system. Along these lines, there is stronger preference given to keeping the metadata intact over keeping the user data intact. As a result, the mapped-RAID system is able to concurrently provide high reliability and high storage efficiency.

Suitable examples for providing such greater reliability preference toward maintaining metadata compared to user data include rebuilding metadata ahead of rebuilding user data, rebuilding metadata at a higher priority than user data, maintaining metadata within a smaller fault domain, proactively relocating metadata more aggressively than proactively relocating user data, combinations thereof, and so on. Such techniques may enable metadata to be stored within 2-way mirrored storage rather than 3-way mirrored storage while still satisfying reliability metrics. Accordingly, such techniques may be able to improve storage efficiency (e.g., a 33% reduction in metadata storage) without sacrificing reliability (e.g., while still complying with a standard set of reliability requirements).

One embodiment is directed to a method of protecting data in a mapped-RAID system. The method includes generating metadata based on user data, storing the metadata in mirrored storage of the mapped-RAID system (e.g., 2-way mirrored storage), and storing the user data in non-mirrored storage of the mapped-RAID system (e.g., in accordance with RAID 6). The mapped-RAID system provides reliability preference toward maintaining the metadata over maintaining the user data while the metadata and the user data are stored within the mapped-RAID system. Accordingly, the method is able to concurrently provide high reliability and high storage efficiency.

In some arrangements, the mapped-RAID system includes storage segments provided by a plurality of storage devices. Additionally, storing the metadata in the mirrored storage of the mapped-RAID system includes writing multiple copies of the metadata into the storage segments of the mapped-RAID system. Furthermore, storing the user data in the non-mirrored storage of the mapped-RAID system includes writing the user data with parity into the storage segments of the mapped-RAID system.

In some arrangements, writing the multiple copies of the metadata into the storage segments includes writing a first copy of the metadata into a first set of storage segments and a second copy of the metadata into a second set of storage segments, the first set of storage segments and the second set of storage segments forming 2-way mirrored storage. Additionally, writing the user data with parity into the storage segments includes generating parity data from the user data, and writing the user data and the parity data as a set of stripes into a third set of storage segments. The third set of storage segments provides, as the non-mirrored storage, N+X redundancy that supports full reconstruction of the user data in response to a storage device failure in which N+X is the total number of storage devices that store each stripe, N is the number of storage devices that store user data of each stripe, X is the number of storage devices that store parity data of each stripe, and X is at least 1.

In some arrangements, writing the user data and the parity data as the set of stripes into the third set of storage segments includes storing the user data and the parity data within the third set of storage segments in accordance with RAID 6 where X equals 2. Suitable RAID widths include 4+2, 6+2, 8+2, and so on.

In some arrangements, the method includes, in response to a storage device failure, rebuilding the metadata ahead of rebuilding the user data. For example, rebuilding the metadata ahead of rebuilding the user data may include rebuilding all metadata that was lost due to the storage device failure to fully restore the multiple copies of the metadata within the storage segments of the mapped-RAID system and, after rebuilding all metadata that was lost due to the storage device failure is complete, rebuilding user data with parity that was lost due to the storage device failure to fully restore the user data with parity within the storage segments of the mapped-RAID system. Such preference towards rebuilding the metadata first reduces metadata rebuild time thus strengthening overall system reliability (e.g., the system more quickly reaches a point in which it can richly and robustly withstand a second similar failure).

In some arrangements, the method further includes (i) at a first priority level, performing host input/output (I/O) operations that access the user data, (ii) at a second priority level that is lower than the first priority level, providing a set of storage services, and (iii) at a third priority level that is higher than the second priority level, rebuilding the metadata in response to a storage device failure and while the host I/O operations are being performed regardless of a current load amount for the host I/O operations. Additionally, in some arrangements, the method further includes, at a fourth priority level, rebuilding the user data in response to the storage device failure and while the host I/O operations are being performed, the fourth priority level being based on the current load amount for the host I/O operations. Such preference towards rebuilding the metadata at a priority that is always relatively high reduces metadata rebuild time thus strengthening overall system reliability.

In some arrangements, the plurality of storage devices is configured into a user data fault domain having a first number of storage devices and a metadata fault domain having a second number of storage devices that is less than the first number of storage devices. Additionally, writing the multiple copies of the metadata into the storage segments of the mapped-RAID system includes storing the multiple copies of the metadata only within the metadata fault domain. Furthermore, writing the user data with parity into the storage segments of the mapped-RAID system includes storing the user data and parity only within the user data fault domain. Since there are fewer storage devices in the metadata fault domain, the likelihood of the metadata fault domain encountering a storage device failure is lower than that of the user data fault domain.

In some arrangements, during a setup time period which is prior to storing the metadata and prior to storing the user data, configuring the plurality of storage devices into the user data fault domain having the first number of storage devices and the metadata fault domain having the second number of storage devices. The second number of storage devices is one fourth of the first number of storage devices. For example, the user data fault domain may be a set of 100 storage devices but the metadata fault domain may be a subset of only 25 storage devices. Such arrangements provide the metadata fault domain with reduced failure probability.

In some arrangements, the method further includes monitoring a respective uncorrectable bit error rate (UBER) for each storage device of the plurality of storage devices. Additionally, the method further includes relocating metadata stored in a particular storage device when the respective UBER for the particular storage device satisfies a first set of relocation criteria that includes a first predefined UBER threshold, and relocating user data stored in the particular storage device when the respective UBER for the particular storage device satisfies a second set of relocation criteria that includes a second predefined UBER threshold that is higher than the first predefined UBER threshold. Accordingly, the metadata is more proactively relocated more aggressively than the user data thus providing preferential treatment to the metadata which strengthens system reliability.

In some arrangements, each storage device has a prescribed wear level. Additionally, the method further includes, during a setup time period prior to storing the metadata and prior storing the metadata, (i) setting the first predefined UBER threshold to be A % of the prescribed wear level of the particular storage device as one of the first set of relocation criteria, and (ii) setting the second predefined UBER threshold to be B % of the prescribed wear level of the particular storage device as one of the second set of relocation criteria, where A is lower than B. For example, the metadata may be relocated from a storage device when the wear level for that storage device reaches 80%, and the user data may be relocated from that storage device when the wear level for that storage device reaches 95%.

Another embodiment is directed to data storage equipment which includes memory and control circuitry coupled to the memory. The memory stores instructions which, when carried out by the control circuitry, cause the control circuitry to generate metadata based on user data, store the metadata in mirrored storage of a mapped-RAID system, and store the user data in non-mirrored storage of the mapped-RAID system.

Yet another embodiment is directed to a computer program product having a non-transitory computer readable medium which stores a set of instructions to protect data in a mapped-RAID system. The set of instructions, when carried out by computerized circuitry, causing the computerized circuitry to perform a method of generating metadata based on user data, storing the metadata in mirrored storage of the mapped-RAID system, and storing the user data in non-mirrored storage of the mapped-RAID system.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in providing reliability bias toward maintaining metadata over maintaining user data while the metadata and the user data are stored within a mapped-RAID system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing reliability bias (or preference) toward maintaining metadata over maintaining user data while the metadata and the user data are stored within a mapped-RAID (Redundant Array of Independent Disks) system. That is, there is stronger preference given to safeguarding the metadata. Accordingly, the mapped-RAID system is able to concurrently provide high reliability (e.g., maintaining compliance with predefined reliability metrics) and high storage efficiency (e.g., enabling 2-way mirrored metadata storage rather than 3-way mirrored metadata storage due to metadata prioritization).

Figure 1:
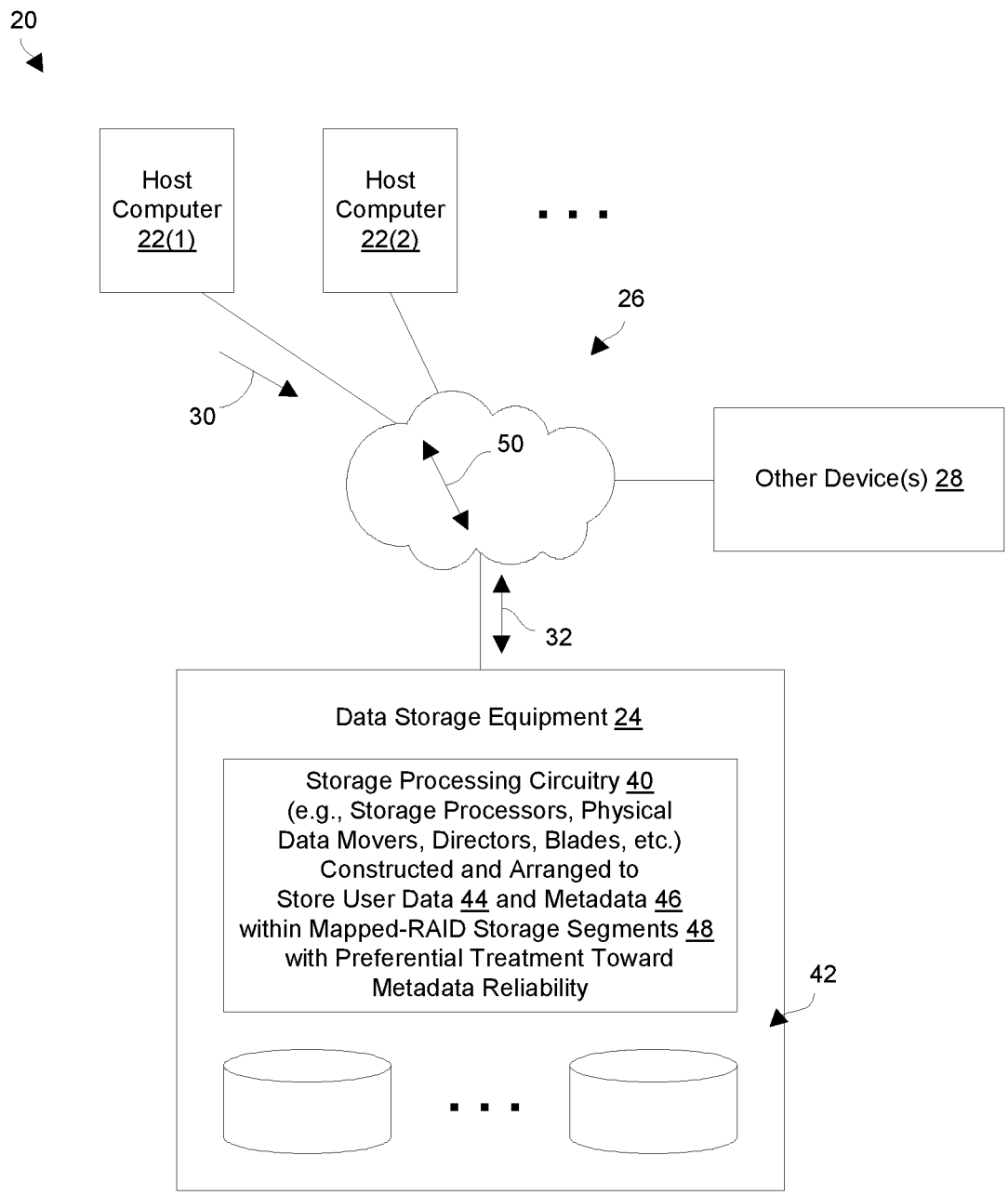
FIG. 1 is a block diagram of a data storage environment which provides reliability preference toward maintaining metadata over maintaining user data in accordance with certain embodiments.

FIG. 1 shows a data storage environment 20 which provides reliability preference toward maintaining metadata over maintaining user data. The data storage environment 20 includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage or non-volatile memory, tiered storage, combinations thereof, etc.).

The data storage equipment 24 includes storage processing circuitry 40 and storage devices 42. The storage processing circuitry 40 is constructed and arranged to respond to the host I/O requests 30 from the host computers 22 by writing user data 44 and metadata 46 into the storage devices 42 and reading the user data 44 and the metadata 46 from the storage devices 42 (e.g., solid state drives, magnetic disk drives, other types of arrays/enclosures/assemblies/etc., combinations thereof, etc.). The storage processing circuitry 40 may include one or more storage processors or engines, data movers, director boards, blades, I/O modules, storage device controllers, switches, other hardware, combinations thereof, and so on.

While processing the host I/O requests 30, the storage processing circuitry 40 stores the user data 44 and the metadata 46 within mapped-RAID storage segments 48 with preferential treatment toward metadata reliability. Additionally, the storage processing circuitry 40 may provide a variety of specialized data storage services and features such as caching, storage tiering, deduplication, compression, encryption, mirroring and/or other RAID protection, snapshotting, backup/archival services, replication to other data storage equipment, and so on.

It should be understood that the user data 44 may include the host data 32 from the host computers 22. The user data 44 may include other data as well such as data created from user-level applications running on the data storage equipment 24, data generated from processing the host data 32 locally on the data storage equipment 24, snapshots of the host data 32, and so on.

It should be further understood that the metadata 46 is specialized data that the data storage equipment generates and maintains to richly and robustly manage the user data 44. Along these lines, the metadata 46 may include configuration information, block mapping data, file system metadata, deduplication data, compression data, versioning data, other data to support recovery, and so on.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include remote data storage equipment that provides user data 44 to and/or receives user data 44 from the data storage equipment 24 (e.g., replication arrays, backup equipment, management devices, etc.).

During operation, the storage processing circuitry 40 of the data storage equipment 24 performs data storage operations to richly and robustly store the user data 44 and the metadata 46 with high reliability and high efficiency. In particular, the storage processing circuitry 40 manages the storage devices 42 using a mapped-RAID architecture. Along these lines, the storage processing circuitry 40 divides each storage device 42 into multiple storage segments 48 (i.e., contiguous adjacent regions of storage). The storage processing circuitry 40 then stores the user data 44 and the metadata 46 within the storage segments 48 in accordance with a set of data protection schemes (e.g., RAID 1, RAID 5, RAID 6, etc.) in a manner that provides high availability.

It should be understood that some data storage requirements impose a maximum amount of time at which the metadata 46 is vulnerable to a single point of failure. For example, suppose that the metadata 46 is not permitted to reside as simply a single copy within the data storage equipment 24 for more than four hours. Further suppose that if no preferential treatment is given to rebuilding the metadata 46, it may take more than four hours to rebuild the metadata 46 following a storage device failure. In such a situation, the metadata 46 should be stored in a 3-way mirror so that even in the event of a storage device failure, the metadata 46 will not reside simply as a single copy within the data storage equipment 24 for more than four hours.

However, suppose that with the preferential treatment provided to the metadata 46 as disclosed herein it takes less than four hours to rebuild the metadata 46 following a storage device failure. For example, suppose that if the metadata 46 residing on the failed storage device is rebuilt ahead of any user data 44 and/or the metadata rebuilding task is maintained at a high priority regardless of system load, metadata rebuilding takes less than four hours. Accordingly, using a 3-way mirror to store the metadata 46 is unnecessary and storing the metadata 46 in 2-way mirrored storage is sufficient (i.e., the metadata 46 will not reside simply as a single copy within the data storage equipment 24 for more than four hours). As a result, there is less storage required to store the metadata 46 (e.g., a 33% reduction in metadata storage).

It should be further understood that there may be other ways of providing reliability bias towards the metadata 46 that enable the data storage equipment 24 to satisfy certain reliability requirements. For example, in accordance with certain embodiments, the data storage equipment 24 maintains metadata 46 within a smaller fault domain than that for user data 44 to reduce the probability of the metadata encountering a storage device failure. As another example, in accordance with certain embodiments, the data storage equipment 24 proactively relocates the metadata 46 from gaining storage devices 42 more aggressively to reduce the uncorrectable bit error rate (UBER) for the metadata 46 compared to the user data 44 thus lowering the likelihood of encountering a failure of a storage device 42 that stores metadata 46.

It should also be appreciated that resiliency for the user data 44 does not need to be as great as that for the metadata 46. Rather, the data storage equipment 24 may store the user data 44 within storage segments 48 using a "user data with parity" schema such as RAID 5 or RAID 6. Accordingly, such a configuration provides a healthy combination of data resiliency and storage efficiency.

In accordance with certain embodiments, the storage processing circuitry 40 stores the metadata 46 in storage segments 48 which are configured as 2-way mirrored storage, and stores the user data 44 in storage segments 48 which are configured as stripes of user data with parity such as RAID 6 (i.e., two parity segments 48). It should be appreciated that since the metadata 46 requires more frequent access, protecting the metadata 46 via mirrored storage rather than via parity alleviates parity updating thus providing a further improvement in overall efficiency.

To illustrate the gain in storage efficiency, suppose that the metadata 46 tends to consume about 10% of the overall storage and the user data 44 tends consume about 90% of the overall storage. Further suppose that the user data 44 is stored using RAID6(16+2). If 3-way mirrored storage is required to store X amount of user data 44, the storage efficiency may be computed as follows:

$$3*0.10*X + \frac{16+2}{16}*X = 1 \quad (1)$$

$$X = 70.2\% \quad (2)$$

In this situation, equation (1) represents a computation for overall storage using 3-way mirrored storage for metadata protection. Additionally, equation (2) shows the resulting value of X. Accordingly, the user data 44 is only 70.2% of all of the data maintained by the data storage equipment 24 to provide RAID reliability.

However, since only 2-way mirrored storage is required to store X amount of user data 44, the storage efficiency may be computed as follows:

$$2*0.10*X + \frac{16+2}{16}*X = 1 \quad (3)$$

$$X = 75.5\% \quad (4)$$

In this situation, equation (3) represents a computation for overall storage using 2-way mirrored storage for metadata protection. Furthermore, equation (4) shows the resulting value of X. Accordingly, the user data 44 is 75.5% of all of the data maintained by the data storage equipment 24 to provide RAID reliability. Therefore, there is a significant increase in storage efficiency using 2-way mirrored storage for metadata protection. Further details will now be provided with reference to FIG. 2.

Figure 2:
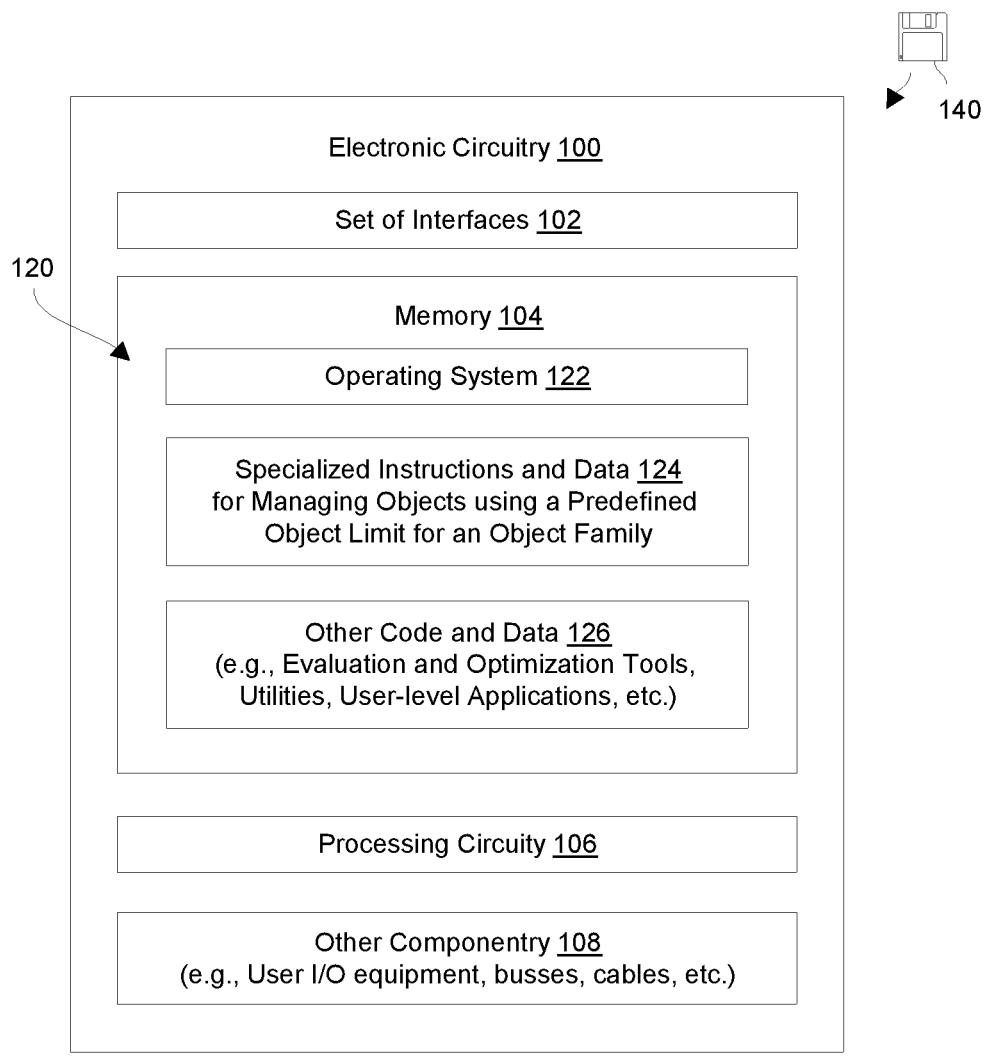
FIG. 2 is a block diagram of data storage equipment of the data storage environment of FIG. 1 in accordance with certain embodiments.

FIG. 2 shows electronic circuitry 100 which is suitable for the storage processing circuitry 40 of the data storage equipment 24 (also see FIG. 1). The electronic circuitry 100 includes a set of interfaces 102, memory 104, and processing circuitry 106, and other circuitry 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular control code for providing reliability preference toward maintaining metadata over maintaining user data while the metadata and the user data are stored within a mapped-RAID system. In some arrangements, the specialized instructions and data 124 is tightly integrated with or part of the operating system 122 itself. The other code and data 126 refers to applications and routines to provide additional operations and services (e.g., performance measurement tools, etc.), user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of a set of hosts. Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 140 is capable of delivering all or portions of the software constructs 120 to the storage processing circuitry 106. In particular, the computer program product 140 has a non-transitory (or non-volatile) computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), busses, cabling, adaptors, auxiliary apparatuses, other specialized data storage componentry, etc.

It should be understood that the processing circuitry 106 operating in accordance with the software constructs 120 enables providing preferential treatment toward maintaining metadata 46 over maintaining user data 44 while the metadata 46 and the user data 44 are stored within a mapped-RAID system. That is, there is stronger preference given to safeguarding the metadata 46. Accordingly, the mapped-RAID system is able to concurrently provide high reliability and high storage efficiency. Further details will now be provided with reference to FIGS. 3 and 4.

Figure 3:
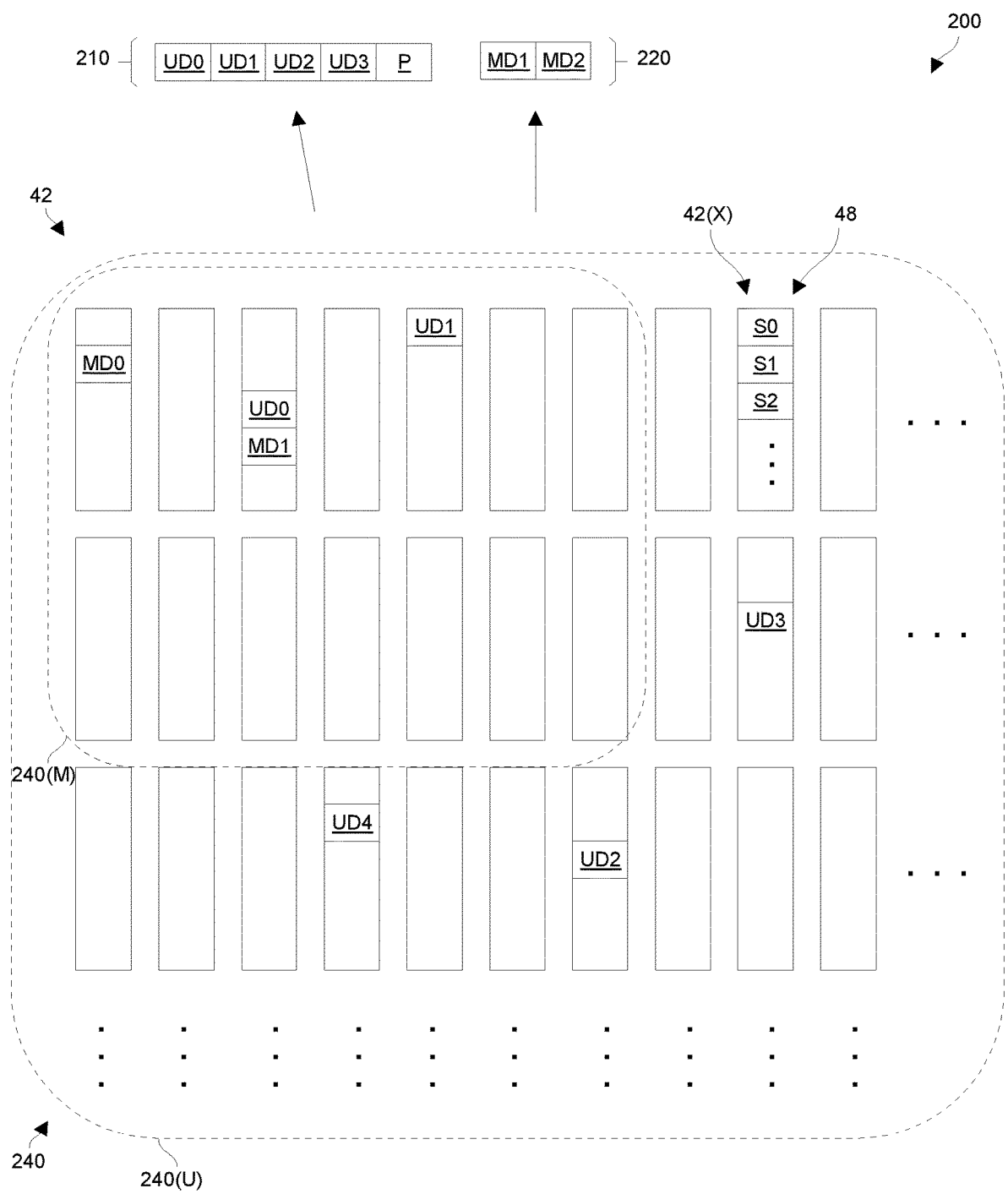
FIG. 3 is a block diagram illustrating example operating details in accordance with certain embodiments.
Figure 4:
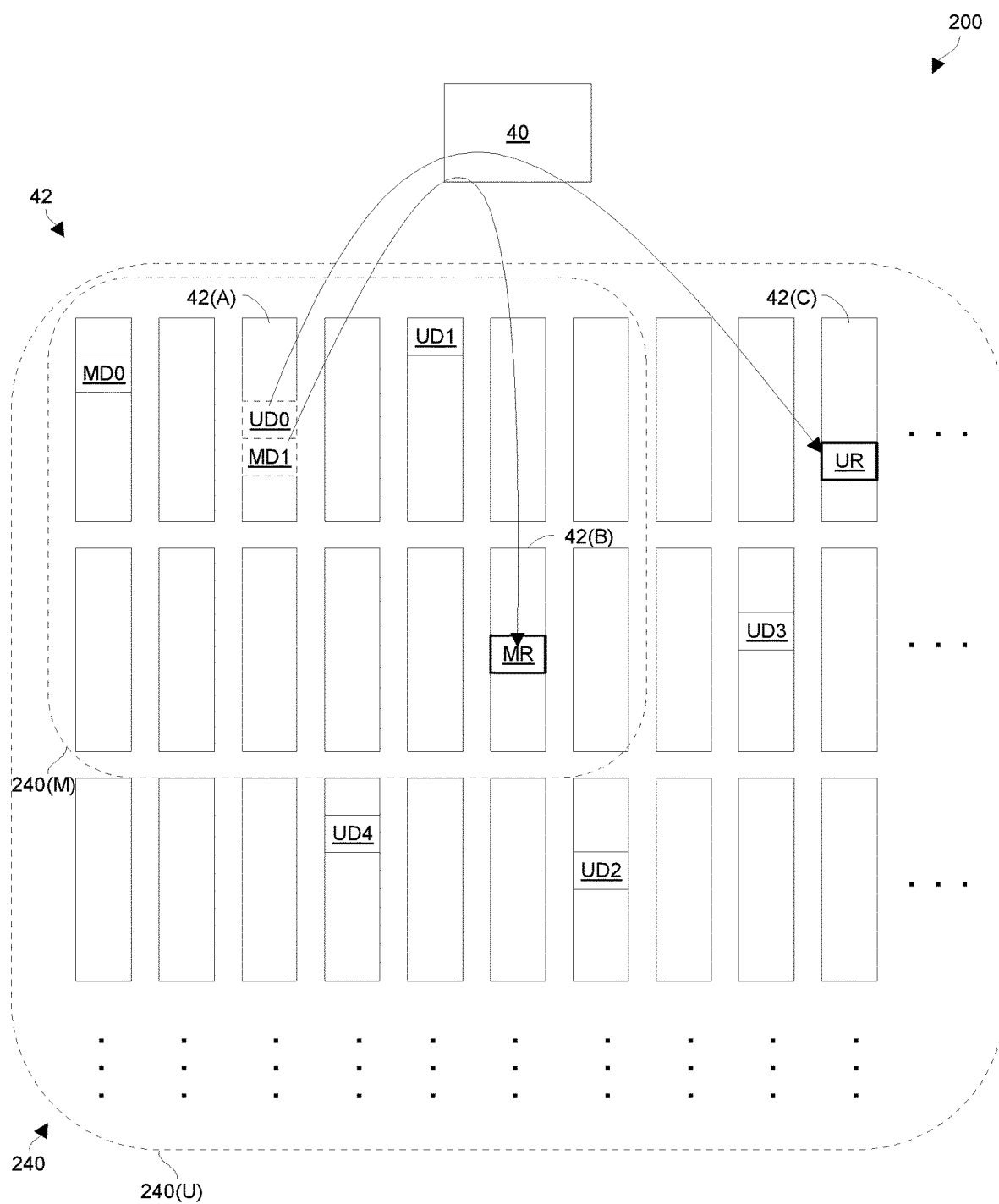
FIG. 4 is a block diagram illustrating additional example operating details in accordance with certain embodiments.

FIGS. 3 and 4 show various data storage equipment details in accordance with certain embodiments. FIG. 3 shows the storage devices 42 arranged in an example mapped-RAID configuration 200. FIG. 4 shows particular operations that are performed by the storage processing circuitry 40.

With attention initially on FIG. 3, the mapped-RAID configuration 200 includes an array of storage devices 42. The mapped-RAID configuration 200 may include just a small number of storage devices 42 (e.g., five, six, etc.). Alternatively, the mapped-RAID configuration 200 may include a large number of storage devices 42 (e.g., 64, 100, 200, etc.).

Each storage device 42 is divided into multiple contiguous and adjacent storage segments (or drive extents) 48, where each storage segment 48 only stores user data 44 or only stores metadata 46. For illustration purposes, FIG. 3 shows the storage device 42(X) as being divided into contiguous and adjacent storage segments 48 which are labeled S(0), S(1), S(2), and so on.

With each storage device 42 divided into the storage segments 48, the storage segments 48 are then combined to form various storage constructs in accordance with one or more RAID levels (e.g., RAID1, RAID5, RAID6, RAID10, etc.). It should be understood that the storage devices 42 provide flexibility in that different RAID levels may be implemented within the same mapped-RAID configuration 200 (e.g., RAID1 and RAID5, RAID1 and RAID6, etc.).

Along these lines, some storage segments 48 of the mapped-RAID configuration 200 may be arranged into a RAID extent (or uber structure) to reliably store the user data 44 as stripes of user data and parity such as in accordance with RAID5(4+1). For example, the storage segments 48 which are labeled UD0, UD1, UD2, UD3, and P form a RAID extent (or uber structure) 210 that stores user data 44 in this manner. Such storage of user data 44 provides relatively high storage efficiency (e.g., compared to mirrored storage) as well as the ability to recover data from a lost/failed storage segment 48 (e.g., via XOR operations on data in the remaining storage segments 48).

Additionally, other storage segments 48 of the mapped-RAID configuration 200 may be arranged into a storage mirror 220 to reliably store the metadata 46 as mirrored data such as in accordance with RAID1. For example, the storage segments 48 which are labeled MD0 and MD1 form 2-way mirrored storage that stores metadata 46 in this manner. Such storage of the metadata 46 provides good storage efficiency (e.g., relative to 3-way mirrored storage) as well as the ability to quickly recover data from a lost/failed storage segment 48 (e.g., via simply copying data from the remaining storage segment 48).

To demonstrate storage reliability that is provided by the mapped-RAID configuration 200, attention is now directed to FIG. 4. Suppose that there is a failure of the storage device 42(A) that includes the storage segment UD0 that holds user data 44 and the storage segment MD1 that holds metadata 46 (also see FIG. 3). In such a situation, the storage processing circuitry 40 is able to reconstruct the lost user data 44 and the lost metadata 46.

To this end and as shown in FIG. 4, the storage processing circuitry 40 recreates the 2-way mirrored storage that stores the metadata 46. In particular, to replace the storage segment MD1, the storage processing circuitry 40 identifies a new storage segment MR of the storage device 42(B). The storage processing circuitry 40 then copies the metadata 46 that resides in the storage segment MD0 (i.e., a full copy of the metadata 46) to the new storage segment MR. Accordingly, the 2-way mirrored storage that stores the metadata 46 is now fully restored, i.e., storage segments MD0 and MR now form new 2-way mirrored storage that holds the metadata 46.

Additionally, the storage processing circuitry 40 recreates the RAID extent that held the user data 44 as stripes of user data and parity. In particular, to replace the storage segment UD0, the storage processing circuitry 40 identifies a new storage segment UR of the storage device 42(C). The storage processing circuitry 40 then rebuilds the portion of the user data 44 that was lost on the failed storage device 48(A). Along these lines, the storage processing circuitry 40 reads the data from the remaining storage segments UD1, UD2, UD3, and P, performs XOR operations on that data to rebuild the portion of the user data 44 that was lost, and writes that portion to the new storage segment UR. As the storage processing circuitry 40 rebuilds the lost portion of the user data 44, the storage processing circuitry 40 may update the metadata 46 stored within the mapped-RAID configuration 200. Accordingly, the RAID extent that stores the user data 44 is now fully restored.

As mentioned earlier, the storage processing circuitry 40 provides preferential treatment (or favorable biasing) that provides higher reliability for the metadata 46 over the user data 44. Below are several example biasing techniques that provide such preferential treatment towards the metadata 46. It should be understood that each biasing technique may be standalone or may be combined with one or more other biasing techniques.

A first metadata biasing technique involves rebuilding metadata 46 ahead of rebuilding user data 44 in response to failure of a storage device 42. Such a metadata biasing technique results in recovering the metadata 46 faster than an approach of rebuilding the data sequentially by starting at one end of the storage device (e.g., from the lowest address) and moving to the other end (e.g., to the highest address).

For example, in the context of the mapped-RAID configuration 200, suppose that the storage device 42(A) in FIG. 4 fails. In such a situation, the storage processing circuitry 40 performs the metadata rebuilding task ahead of performing the user data rebuilding task. Accordingly, the amount of time that the data storage equipment 24 operates with only one remaining copy of the metadata 46 that resided on the 2-way mirrored storage 220 is minimized.

A second metadata biasing technique involves placing the task of rebuilding metadata 46 at a priority that is consistently high in response to failure of a storage device 42. Such a metadata biasing technique results in recovering the metadata 46 faster than an approach of setting the priority for the metadata rebuilding task based on other criteria such as current loading of host I/O requests.

For example, in the context of the mapped-RAID configuration 200, suppose that the storage device 42(A) in FIG. 4 fails. In such a situation, the storage processing circuitry 40 places the metadata rebuilding task to a priority that is always high (i.e., independent of the current I/O load). Along these lines, the storage processing circuitry 40 may allocate less processing time to certain background tasks such as garbage collection, deduplication fingerprint consolidation, etc. as long as critical tasks are not starved out. Accordingly, the storage processing circuitry 40 may spend more time performing the metadata rebuilding task compared to such other tasks thus minimizing the amount of time that the data storage equipment 24 operates with only one remaining copy of the metadata 46 that resided on the 2-way mirrored storage 220.

Another metadata biasing technique involves storing the metadata 46 in a smaller fault domain (e.g., a collection of components that share the same failure points) than that for the user data 44. That is, if the storage processing circuitry 40 stores the user data 44 in a user data fault domain that includes N storage devices 42, the storage processing circuitry 40 stores the metadata 44 in a metadata fault domain that includes less than N storage devices 42. Since there are less storage devices 42 in the metadata fault domain, the likelihood that the metadata fault domain will encounter a storage device failure is lower than that of the user data fault domain.

For example, the mapped-RAID configuration 200 of FIGS. 3 and 4 includes a user data fault domain 240(U) and a metadata fault domain 240(M) (collectively, fault domains 240). The user data fault domain 240(U) may be relatively large. However, the metadata fault domain 240(M), which is a subset of the user data fault domain 240(U), is smaller. Along these lines, if the user data fault domain 240(U) includes 100 storage devices 42 and the metadata fault domain 240(M) includes 25 storage devices, 42, the size of the metadata fault domain 240(M) is only one fourth the size of the user data fault domain 240(U). Accordingly, the likelihood of that the metadata fault domain 240(M) will encounter a storage device failure is substantially lower (e.g., one fourth) than that of the user data fault domain 240(U). Such preferential treatment results in improved metadata reliability.

Yet another metadata biasing technique involves initiating metadata relocation at a lower UBER (uncorrectable bit error rate) threshold than that for initiating user data relocation. That is, if the storage processing circuitry 40 relocates metadata 46 from a storage device 42 when the storage device 42 reaches 80% of its prescribed wear level but relocates user data from the storage device 42 when the storage device 42 reaches 95% of its prescribed wear level (or designated useful life), metadata reliability will be higher.

For example, with reference to FIG. 4, suppose that the storage device 42(A) reaches 80% of its prescribed wear level. At this point, the storage processing circuitry 40 proactively relocates the metadata 46 stored on the storage device 42(A) to another storage segment 48 (e.g., the storage segment 48 labeled MR of the storage device 42(B)) while maintaining the user data 44 currently stored on the storage device 42(A). Later, when storage device 42(A) reaches 95% of its prescribed wear level, the storage processing circuitry 40 proactively relocates the user data 44 stored on the storage device 42(A) to another storage segment 48 (e.g., the storage segment 48 labeled UR of the storage device 42(C)). Accordingly, the metadata 46 is moved from the storage device 42(A) much earlier than the expected failure time for the storage device 42(A) vis-à-vis the user data 44. Thus, such preferential treatment towards the metadata 46 results in higher metadata reliability.

It should be understood that the actual lifetime for a particular storage device 42 may be significantly higher than the prescribed wear level for that storage device 42. Moreover, certain factors such as read error rates, write error rates, etc. may indicate that a particular storage device 42 may have a significantly higher lifetime. Accordingly, in some arrangements, triggering the storage processing circuitry 40 to proactively relocate metadata 46 and/or user data 44 from an aging storage device 42 may include one or more other criteria/factors.

It should be further understood that any of the above-described metadata biasing techniques may be combined with one or more of the other metadata biasing techniques. Moreover, other data reliability techniques may be combined with the ones disclosed herein. Further details will now be provided with reference to FIG. 5.

Figure 5:
FIG. 5 is a block diagram illustrating transitioning of a data storage system from a configuration in which there is no preferential treatment toward metadata over user data to another configuration in which there is preferential treatment toward the metadata in accordance with certain embodiments.

FIG. 5 shows, by way of example, how circuitry of a data storage system may be transitioned from an initial mode 300 in which there is no preferential treatment given to metadata reliability over user data reliability to an improved mode 310 in which there is preferential treatment given to metadata reliability over user data reliability. Such a change in circuitry operation is illustrated by the arrow 320.

With reference to the initial mode 300, if there is a failure of a storage device 42, the circuitry of the data storage system is configured to rebuild all of the data that is stored on failed storage device 42 from beginning to end. Here, there is no preference given to whether the data is user data 44 or metadata 46. Rather, the circuitry simply rebuilds all of the data (e.g., sequentially) in a manner that provides no preference.

Additionally, regarding the initial mode 300, if there is a failure of a storage device 42, the circuitry of the data storage system is configured to rebuild all of the data that is stored on failed storage device 42 where the task of rebuilding the data is based on current I/O loading (or impact). Along these lines, if the data storage system is heavily loaded with host I/O requests, all of the rebuild operations may be set to a lower priority in order to avoid introducing significant latency when processing the host I/O requests. However, if the data storage system is lightly loaded, all of the rebuild operations may be set to a higher priority to accelerate rebuilding both the lost user data 44 and the lost metadata 46.

Furthermore, regarding the initial mode 300, the user data 44 and the metadata 46 share the same fault domain. For example, the circuitry of the data storage system may distribute the user data 44 and the metadata 46 among all of the storage devices 42, i.e., among the entire system. As a result, the user data 44 and the metadata 46 are equally susceptible to a storage device failure. That is, since the user data 44 and the metadata 46 are evenly distributed across all of the storage devices 42, when a storage device 42 does fail, there will be an impact on metadata reliability.

Also, regarding the initial mode 300, the user data 44 and the metadata 46 on a storage device 42 are proactively relocated when the wear level of that storage device 42 reaches a certain threshold, perhaps among other proactive relocation criteria that does not distinguish between user data 44 and the metadata 46. Accordingly, the user data 44 and the metadata 46 are equally susceptible to errors (e.g., the same LIBER) and storage device failure.

It should be understood that the data storage system may be required to satisfy certain storage requirements such as user data storage on a particular RAID level, a set of reliability metrics, a particular storage level agreement/license, etc. By way of example, the initial mode 300 dictates that the user data 44 is to be storage in accordance with RAID6.

However, since intact metadata 46 may be critical to proper data storage system operation, the data storage system may be required to not allow the metadata 46 to be at risk to a single point of failure for more than a predefined time window (e.g., four hours, six hours, etc.). Moreover, since the metadata 46 may be accessed very frequently, storing the metadata 46 and having to rebuild the metadata 46 from a RAID6 configuration may be impractical. Accordingly, to satisfy reliability metrics, the initial mode 300 involves storing the metadata 46 on 3-way mirrored storage.

In contrast to the initial mode 300, the improved mode 310 gives preferential treatment to metadata reliability over user data reliability. A transition 320 from the initial mode 300 to the improved mode 310 may be effectuated in a variety of ways such as replacing initial operating code with new operating code, changing a set of operating parameters, reconfiguring certain circuitry, moving data, combinations thereof, and so on (also see FIG. 2).

With reference to the improved mode 310, if there is a failure of a storage device 42, the circuitry of the data storage system is configured to rebuild the metadata 46 before rebuilding the user data 44. That is, rather than simply rebuilding all of the data that resided on the failed storage device 42 sequentially, the segments 48 of the failed storage device 42 that stored the metadata 46 are rebuilt first. Since there is preference given to rebuilding the metadata 46 ahead of rebuilding the user data 44, the rebuild time for the metadata 46 is reduced.

Additionally, regarding the improved mode 310, if there is a failure of a storage device 42, the circuitry of the data storage system is configured to set the priority for rebuilding the metadata 46 always high. Here, the priority for rebuilding the user data 44 may continue to be based on current I/O loading (or impact). In some arrangements, the priority of the metadata rebuilding task may be the same as the priority for processing host I/O requests. With the priority for rebuilding the metadata 46 constantly high, the metadata reliability receives preferential treatment and the metadata 46 will be restored faster compared to the initial mode 300.

Furthermore, regarding the improved mode 310, the user data 44 and the metadata 46 share different fault domains 240 (also see FIGS. 3 and 4). In particular, there fault domain 240(M) for metadata 46 is smaller than the fault domain 240(U) for user data 44 thus lowering the likelihood that the metadata 46 will encounter a storage device failure. For example, the circuitry of the data storage system may distribute the user data 44 among a large group of storage devices 42 (e.g., 100 storage devices 42) and distribute the metadata 46 among a small subset of that group (e.g., 25 storage devices 42). As a result, the metadata 46 is less susceptible to a storage device failure. For example, a failure of one of the storage devices 42 that is part of the fault domain 24(U), but not part of the fault domain 24(M) (e.g., see FIGS. 3 and 4), does not reduce metadata reliability.

Also, regarding the improved mode 310, the user data 44 and the metadata 46 on a storage device 42 are proactively relocated when the wear level of that storage device 42 reaches a certain threshold, perhaps among other proactive relocation criteria that does not distinguish between user data 44 and the metadata 46. However, since the likelihood of failure increases as storage devices 42 reach their maximum prescribed wear level, the metadata 46 is proactively moved to newer storage devices 42 sooner than the user data 44. Accordingly, the metadata 46 is less susceptible to errors than the user data 44.

It should be understood that the data storage system may be required to satisfy certain storage requirements such as user data storage using a particular RAID level, a set of reliability metrics, a particular storage level agreement/ license, etc. By way of example, the initial mode 300 dictates that the user data 44 is to be stored in accordance with RAID6.

Since intact metadata 46 may be critical to proper data storage system operation, the data storage system may be required to never allow the metadata 46 to be at risk to a single point of failure for more than a predefined time window (e.g., four hours, six hours, etc.). Moreover, since the metadata 46 may be accessed very frequently, storing the metadata 46 and having to rebuild the metadata 46 from a RAID6 configuration may be impractical. Accordingly, to satisfy reliability metrics, the initial mode 300 involves storing the metadata 46 on 3-way mirrored storage. Using mirrored storage rather than RAID6 alleviates the need to update parity and reduces rebuild work (copying segments is less overhead than reading and XORing remaining data segments). Thus, the initial mode 300 stores the metadata 46 in 3-way mirrored storage.

If storage segments 48 for one of the mirrors were to fail, the metadata 46 would still be protected against another failure since there are two remaining copies of the metadata 46. Moreover, the 3-way mirrored storage can be fully restored in relatively little time by simply copying the lost segments from one of the remaining copies to new segment locations.

In contrast, the improved mode 310 enables the storage requirements to be satisfied using 2-way mirrored storage for the metadata 46. For this configuration, if the storage segments 48 for one of the mirrors were to fail, the data storage system provides preferential rebuild treatment to fully restore the metadata 46 in accordance with the storage requirements (e.g., by simply copying the lost segments from another mirror to new segment locations). Moreover, using other preferential treatment techniques on the metadata 46 such as storing the metadata 46 in a smaller fault domain 240 than that for the user data 44, proactively relocating the metadata 46 more aggressively than the user data 44 with respect to wear level, etc. further preserves the ability of the data storage system to comply with storage requirements such as high availability standards (e.g., "nines"), mean time between failure requirements, service level agreement objects, and so on.

It should be understood that, in accordance with certain improvements disclosed herein, high storage reliability and efficiency with mixed redundancy may be provided using different configurations for storing the metadata 46 and different configurations for storing user data 44. For example, in some embodiments, M-way mirrored storage stores the metadata 46 where M is greater than 2. As another example, in some embodiments, the user data 44 is stored using N-parity where N is greater than 2. In a particular embodiment, the metadata 46 is stored in 3-way mirrored storage and the user data 44 is stored using triple parity. Other configuration and/or combinations are suitable for use as well. Further details will now be provided with reference to FIG. 6.

Figure 6:
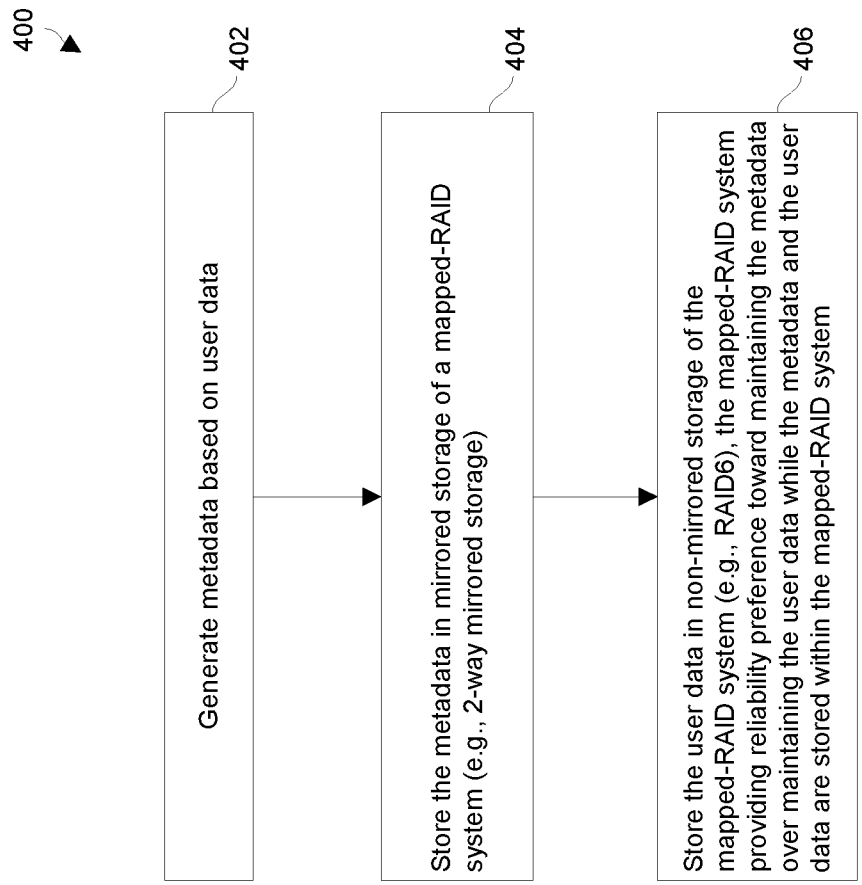
FIG. 6 is a flowchart of a procedure which is performed by circuitry of a data storage environment in accordance with certain embodiments.

FIG. 6 is a flowchart of a procedure 400 which is performed within a data storage environment when protecting data in a mapped-RAID system. In particular, the procedure 400 provides reliability bias (or preference) toward maintaining metadata over maintaining user data while the metadata and the user data are stored within the mapped-RAID system.

At 402, circuitry of the data storage environment generates metadata based on user data. Such user data may include host data from one or more host devices. Such metadata enables the circuitry to perform various data storage operations such as locating the user data on storage devices, reconstructing the user data in response to failures, optimizing storage to improve efficiency, combinations thereof, etc.

At 404, the circuitry stores the metadata in mirrored storage of a mapped-RAID system. In particular, since there is reliability bias toward maintaining metadata over maintaining user data, the metadata may be stored in 2-way mirrored storage.

At 406, the circuitry stores the user data in non-mirrored storage of the mapped-RAID system. For example, the user data may be stored in accordance with RAID6 (user data and parity). It should be understood that the mapped-RAID system provides reliability preference toward maintaining the metadata over maintaining the user data while the metadata and the user data are stored within the mapped-RAID system.

Since there is stronger preference given to safeguarding the metadata, various optimizations are available such as reducing the mirrored storage from being a 3-way mirror to being a 2-way mirror. Nevertheless, high availability standards may be concurrently maintained (e.g., low latency, resiliency to withstand multiple failures, and so on).

As described above, improved techniques are directed to providing reliability preference toward maintaining metadata over maintaining user data while the metadata and the user data are stored within a mapped-RAID system. That is, there is stronger preference given to safeguarding the metadata. Accordingly, the mapped-RAID system is able to concurrently provide high reliability (e.g., maintaining compliance with predefined reliability metrics) and high storage efficiency (e.g., enabling 2-way mirrored metadata storage rather than 3-way mirrored metadata storage due to metadata prioritization).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, in accordance with certain embodiments, it should be understood that conventional storage system designs must deal with the trade-off between storage reliability and storage efficiency.

The higher the redundancy, the higher the storage reliability.

The higher the redundancy, the lower the storage efficiency (i.e., the usable capacity ratio).

Furthermore, in accordance with certain embodiments, data in a storage system can be divided into two categories, metadata (MD) and user data (UD).

MD consists of a smaller portion of the total data (e.g. 10%), and requires more frequent access. In order to achieve better write efficiency, MD is often stored in RAID-1 configurations. RAID-1 has 50% and 67% overhead for 2-way and 3-way.

UD consists of a larger portion of the total data (e.g., 90%), and requires less frequent access. In order to achieve better efficiency, UD is often stored in RAID-5 or RAID-6 configuration. 16+2 has 11% overhead.

Also, in accordance with certain embodiments, the reliability of a storage system depends on a few factors.

Redundancy,

Rebuild time,

Fault domain,

UBER (Uncorrectable Bit Error Rate),

The higher the wear level (WL), the higher the UBER,

It should be understood that, conventionally, storage systems implement the same redundancy for MD and UD. Such design may achieve consistent reliability for both without any special treatment for each. The disadvantage is lower storage efficiency.

However, by giving preferential treatments to MD that has higher overhead, higher reliability may be achieved without increasing its redundancy to the same level as UD. As a result, storage efficiency is improved.

Example—MD=10% UD,

Conventional, MD=RAID-1 3-way; UD=RAID-6 16+2 X=UD=70.2%

3*10%*X+X*(16+2)/16=100%

Improved technique, MD=RAID-1 2-way; UD=RAID-6 16+2 X=UD=75.5%

2*10%*X+X*(16+2)/16=100%

By giving preferential treatments to MD with higher overhead, higher reliability is achieved (e.g., six "nines") without increasing its redundancy to the same level as UD. As a result, UD storage efficiency is improved from 70.2% to 75.5%.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of protecting data in a mapped-RAID (Redundant Array of Independent Disks) system, the method comprising:

generating metadata based on user data;

storing the metadata in mirrored storage of the mapped-RAID system;

storing the user data in non-mirrored storage of the mapped-RAID system, the mapped-RAID system providing reliability preference toward maintaining the metadata over maintaining the user data while the metadata and the user data are stored within the mapped-RAID system;

wherein the mapped-RAID system includes storage segments provided by a plurality of storage devices;

wherein storing the metadata in the mirrored storage of the mapped-RAID system includes:
writing multiple copies of the metadata into the storage segments of the mapped-RAID system; and
wherein storing the user data in the non-mirrored storage of the mapped-RAID system includes:
writing the user data with parity into the storage segments of the mapped-RAID system; and
wherein the method further comprises:
monitoring a respective uncorrectable bit error rate (UBER) for each storage device of the plurality of storage devices,
relocating metadata stored in a particular storage device when the respective UBER for the particular storage device satisfies a first set of relocation criteria that includes a first predefined UBER threshold, and
relocating user data stored in the particular storage device when the respective UBER for the particular storage device satisfies a second set of relocation criteria that includes a second predefined UBER threshold that is higher than the first predefined UBER threshold.

2. A method as in claim 1 wherein writing the multiple copies of the metadata into the storage segments includes:
writing a first copy of the metadata into a first set of storage segments and a second copy of the metadata into a second set of storage segments, the first set of storage segments and the second set of storage segments forming 2-way mirrored storage; and
wherein writing the user data with parity into the storage segments includes:
generating parity data from the user data, and
writing the user data and the parity data as a set of stripes into a third set of storage segments, the third set of storage segments providing, as the non-mirrored storage, N+X redundancy that supports full reconstruction of the user data in response to a storage device failure in which N+X is the total number of storage devices that store each stripe, N is the number of storage devices that store user data of each stripe, X is the number of storage devices that store parity data of each stripe, and X is at least 1.

3. A method as in claim 2 wherein writing the user data and the parity data as the set of stripes into the third set of storage segments includes:
storing the user data and the parity data within the third set of storage segments in accordance with RAID 6 where X equals 2.

4. A method as in claim 1, further comprising:
in response to a storage device failure, rebuilding the metadata ahead of rebuilding the user data.

5. A method as in claim 4 wherein rebuilding the metadata ahead of rebuilding the user data includes:
rebuilding all metadata that was lost due to the storage device failure to fully restore the multiple copies of the metadata within the storage segments of the mapped-RAID system, and
after rebuilding all metadata that was lost due to the storage device failure is complete, rebuilding user data with parity that was lost due to the storage device failure to fully restore the user data with parity within the storage segments of the mapped-RAID system.

6. A method as in claim 1, further comprising:
setting a priority for performing host input/output (I/O) operations that access the user data to a first priority level,
setting a priority for providing a set of storage services to a second priority level that is lower than the first priority level, and
setting a priority for rebuilding the metadata in response to a storage device failure to a third priority level that is higher than the second priority level.

7. A method as in claim 6, further comprising:
setting a priority for rebuilding the user data in response to the storage device failure to a fourth priority level, the fourth priority level being based on the current load amount for the host I/O operations.

8. A method as in claim 1 wherein the plurality of storage devices is configured into a user data fault domain having a first number of storage devices and a metadata fault domain having a second number of storage devices that is less than the first number of storage devices; and
wherein writing the multiple copies of the metadata into the storage segments of the mapped-RAID system includes:
storing the multiple copies of the metadata only within the metadata fault domain; and
wherein writing the user data with parity into the storage segments of the mapped-RAID system includes:
storing the user data and parity only within the user data fault domain.

9. A method as in claim 8, further comprising:
during a setup time period which is prior to storing the metadata and prior to storing the user data, configuring the plurality of storage devices into the user data fault domain having the first number of storage devices and the metadata fault domain having the second number of storage devices, the second number of storage devices being one fourth of the first number of storage devices.

10. A method as in claim 1 wherein each storage device has a prescribed wear level; and
wherein the method further comprises:
during a setup time period prior to storing the metadata and prior storing the metadata, (i) setting the first predefined UBER threshold to be A % of the prescribed wear level of the particular storage device as one of the first set of relocation criteria, and (ii) setting the second predefined UBER threshold to be B % of the prescribed wear level of the particular storage device as one of the second set of relocation criteria, where A is lower than B.

11. Data storage equipment, comprising:
memory; and
control circuitry coupled to the memory, the memory storing instructions which, when carried out by the control circuitry, cause the control circuitry to:
generate metadata based on user data,
store the metadata in mirrored storage of a mapped-RAID (Redundant Array of Independent Disks) system, and
store the user data in non-mirrored storage of the mapped-RAID system, the mapped-RAID system providing reliability preference toward maintaining the metadata over maintaining the user data while the metadata and the user data are stored within the mapped-RAID system;
wherein the mapped-RAID system includes storage segments provided by a plurality of storage devices;
wherein storing the metadata in the mirrored storage of the mapped-RAID system includes:
writing multiple copies of the metadata into the storage segments of the mapped-RAID system; and wherein storing the user data in the non-mirrored storage of the mapped-RAID system includes:
writing the user data with parity into the storage segments of the mapped-RAID system; and
wherein the control circuitry is further constructed and arranged to:
monitor a respective uncorrectable bit error rate (UBER) for each storage device of the plurality of storage devices,
relocate metadata stored in a particular storage device when the respective UBER for the particular storage device satisfies a first set of relocation criteria that includes a first predefined UBER threshold, and
relocate user data stored in the particular storage device when the respective UBER for the particular storage device satisfies a second set of relocation criteria that includes a second predefined UBER threshold that is higher than the first predefined UBER threshold.

12. A computer program product having a non-transitory computer readable medium which stores a set of instructions to protect data in a mapped-RAID (Redundant Array of Independent Disks) system; the set of instructions, when carried out by computerized circuitry, causing the computerized circuitry to perform a method of:
generating metadata based on user data;
storing the metadata in mirrored storage of the mapped-RAID system; and
storing the user data in non-mirrored storage of the mapped-RAID system;
wherein the mapped-RAID system includes storage segments provided by a plurality of storage devices;
wherein storing the metadata in the mirrored storage of the mapped-RAID system includes:
writing multiple copies of the metadata into the storage segments of the mapped-RAID system; and
wherein storing the user data in the non-mirrored storage of the mapped-RAID system includes:
writing the user data with parity into the storage segments of the mapped-RAID system; and
wherein the method further comprises:
monitoring a respective uncorrectable bit error rate (UBER) for each storage device of the plurality of storage devices,
relocating metadata stored in a particular storage device when the respective UBER for the particular storage device satisfies a first set of relocation criteria that includes a first predefined UBER threshold, and
relocating user data stored in the particular storage device when the respective UBER for the particular storage device satisfies a second set of relocation criteria that includes a second predefined UBER threshold that is higher than the first predefined UBER threshold.

13. A computer program product as in claim 12 wherein writing the multiple copies of the metadata into the storage segments includes:
writing a first copy of the metadata into a first set of storage segments and a second copy of the metadata into a second set of storage segments, the first set of storage segments and the second set of storage segments forming 2-way mirrored storage; and
wherein writing the user data with parity into the storage segments includes:
generating parity data from the user data, and
writing the user data and the parity data as a set of stripes into a third set of storage segments, the third set of storage segments providing, as the non-mirrored storage, N+X redundancy that enables full reconstruction of the user data in response to a storage device failure in which N+X is the total number of storage devices that store each stripe, N is the number of storage devices that store user data of each stripe, X is the number of storage devices that store parity data of each stripe, and X is at least 1.

14. A computer program product as in claim 13 wherein the method further comprises:
in response to a storage device failure, rebuilding the metadata ahead of rebuilding the user data.

15. A computer program product as in claim 14 wherein the method further comprises:
setting a priority for performing host input/output (I/O) operations that access the user data to a first priority level, and
setting a priority for providing a set of storage services to a second priority level that is lower than the first priority level;
wherein rebuilding the metadata ahead of rebuilding the user data includes:
setting a priority for rebuilding the metadata in response to a storage device failure to a third priority level that is higher than the second priority level, and
setting a priority for rebuilding the user data in response to the storage device failure to a fourth priority level the fourth priority level being based on the current load amount for the host I/O operations.

16. A computer program product as in claim 15 wherein the plurality of storage devices is configured into a user data fault domain having a first number of storage devices and a metadata fault domain having a second number of storage devices that is less than the first number of storage devices; and
wherein writing the first copy of the metadata into the first set of storage segments and the second copy of the metadata into the second set of storage segments includes:
storing the first and second copies of the metadata only within the metadata fault domain; and
wherein writing the user data and the parity data as the set of stripes into the third set of storage segments includes:
storing the user data and the parity data only within the user data fault domain.

17. Data storage equipment as in claim 11 wherein writing the multiple copies of the metadata into the storage segments includes:
writing a first copy of the metadata into a first set of storage segments and a second copy of the metadata into a second set of storage segments, the first set of storage segments and the second set of storage segments forming 2-way mirrored storage; and
wherein writing the user data with parity into the storage segments includes:
generating parity data from the user data, and
writing the user data and the parity data as a set of stripes into a third set of storage segments, the third set of storage segments providing, as the non-mirrored storage, N+X redundancy that supports full reconstruction of the user data in response to a storage device failure in which N+X is the total number of storage devices that store each stripe, N is the number of storage devices that store user data of each stripe, X is the number of storage devices that store parity data of each stripe, and X is at least 1.

18. Data storage equipment as in claim 11 wherein the control circuitry is further constructed and arranged to:

in response to a storage device failure, rebuild the metadata ahead of rebuilding the user data.

19. Data storage equipment as in claim 11 wherein the control circuitry is further constructed and arranged to:
- set a priority for performing host input/output (I/O) operations that access the user data to a first priority level,
- set a priority for providing a set of storage services to a second priority level that is lower than the first priority level, and
- set a priority for rebuilding the metadata in response to a storage device failure to a third priority level that is higher than the second priority level.

20. Data storage equipment as in claim 11 wherein the plurality of storage devices is configured into a user data fault domain having a first number of storage devices and a metadata fault domain having a second number of storage devices that is less than the first number of storage devices; and
- wherein writing the multiple copies of the metadata into the storage segments of the mapped-RAID system includes:
  - storing the multiple copies of the metadata only within the metadata fault domain; and
- wherein writing the user data with parity into the storage segments of the mapped-RAID system includes:
  - storing the user data and parity only within the user data fault domain.

\* \* \* \* \*